(12) United States Patent
Meyers

(10) Patent No.: US 7,438,326 B1
(45) Date of Patent: Oct. 21, 2008

(54) TEE BAFFLE FOR USE AT INLET OR OUTLET OF SEPTIC AND OTHER ON-SITE WASTE DISPOSAL SYSTEMS

(75) Inventor: Theodore W. Meyers, Barrington, IL (US)

(73) Assignee: Tuf-Tite, Inc., Lake Zurich, IL (US)

( * ) Notice: Subject to any disclaimer, the term of this patent is extended or adjusted under 35 U.S.C. 154(b) by 349 days.

(21) Appl. No.: 09/652,927

(22) Filed: Aug. 31, 2000

(51) Int. Cl.
*F16L 39/00* (2006.01)
*F16L 39/04* (2006.01)

(52) U.S. Cl. .............. 285/133.11; 285/125.1; 285/129.1

(58) Field of Classification Search ............ 285/133.11, 285/125.1, 65, 67, 129.1, 373, 419, 148.13, 285/148.18
See application file for complete search history.

(56) References Cited

U.S. PATENT DOCUMENTS

| | | | | | |
|---|---|---|---|---|---|
| 901,545 | A | * | 10/1908 | Morrison | 285/148.23 |
| 931,171 | A | * | 8/1909 | Williams | 285/148.23 |
| 1,052,198 | A | * | 2/1913 | Wyre | 285/399 |
| 2,898,945 | A | * | 8/1959 | Backer | 138/99 |
| 2,900,084 | A | * | 8/1959 | Zabel | 210/460 |
| 2,910,314 | A | * | 10/1959 | Klein | 285/148.23 |
| 3,332,552 | A | * | 7/1967 | Zabel | 210/86 |
| 3,348,689 | A | * | 10/1967 | Kraissl, Jr. | 210/238 |
| 3,519,133 | A | * | 7/1970 | Broering | 210/232 |
| 3,572,395 | A | | 3/1971 | Burns, Jr. | |
| 3,633,943 | A | | 1/1972 | Ramm et al. | |
| 3,654,965 | A | * | 4/1972 | Gramain | 138/89 |
| 3,709,527 | A | * | 1/1973 | Nations | 285/110 |
| 3,709,532 | A | | 1/1973 | Callgiuri | |
| 3,719,209 | A | * | 3/1973 | Rush et al. | 138/177 |
| 3,904,228 | A | * | 9/1975 | Maroschak | 285/133.11 |
| 4,109,944 | A | | 8/1978 | Curtin | |
| 4,260,181 | A | | 4/1981 | Curtin | |
| 4,363,732 | A | | 12/1982 | Crates et al. | |
| 4,557,261 | A | * | 12/1985 | Rugheimer | 604/533 |
| 4,605,501 | A | | 8/1986 | Tyson | |
| 4,681,684 | A | * | 7/1987 | Maroschak et al. | 210/532.2 |
| 4,690,632 | A | * | 9/1987 | Carrow | 425/429 |
| 4,710,295 | A | * | 12/1987 | Zabel | 210/336 |
| 4,798,028 | A | * | 1/1989 | Pinion | 52/16 |

(Continued)

OTHER PUBLICATIONS

Tuf-Tite Effluent Filter. Datasheet [online]. 2001 Retrived from the internet: www.tuf-tite.com.*

(Continued)

*Primary Examiner*—Carlos Lugo
(74) *Attorney, Agent, or Firm*—Marshall, Gerstein & Borun LLP

(57) ABSTRACT

A tee baffle for use at the inlet or outlet of a septic tank or other on-site waste drainage system has a thin-walled profile and is provided with ribs along its longitudinal axis and one or more annular ribs. The tee baffle has a lowermost end for accommodating the bell end or hub of a length of pipe to facilitate lengthening the tee to the desired dimension. The tee baffle can accommodate various sizes and types of effluent filters having generally cylindrical profiles, and may be provided with inwardly-directed flanges, tabs, or ribs to hold effluent filters in place and prevent an effluent filter from becoming dislodged from the tee baffle.

3 Claims, 5 Drawing Sheets

U.S. PATENT DOCUMENTS

| | | | |
|---|---|---|---|
| 4,798,404 A * | 1/1989 | Iyanicki | 285/12 |
| 4,824,565 A * | 4/1989 | Middleton | 210/266 |
| 4,951,716 A | 8/1990 | Tsunoda et al. | |
| 4,967,800 A | 11/1990 | Heilmayr et al. | |
| 5,007,666 A | 4/1991 | Kyfes | |
| 5,015,013 A * | 5/1991 | Nadin | 285/64 |
| 5,022,684 A * | 6/1991 | Eagon | 285/12 |
| 5,098,568 A | 3/1992 | Tyson | |
| 5,105,843 A * | 4/1992 | Condron et al. | 137/13 |
| 5,207,896 A * | 5/1993 | Graves | 210/109 |
| 5,240,292 A * | 8/1993 | Roszin | 285/53 |
| 5,277,459 A * | 1/1994 | Braun et al. | 285/419 |
| 5,284,582 A * | 2/1994 | Yang | 210/232 |
| 5,358,283 A | 10/1994 | Silva | |
| 5,462,312 A * | 10/1995 | Carpenter et al. | 285/15 |
| 5,482,621 A * | 1/1996 | Nurse | 210/170 |
| 5,580,453 A * | 12/1996 | Nurse, Jr. | 210/323.3 |
| 5,593,584 A * | 1/1997 | Nurse, Jr. | 210/346 |
| 5,616,841 A * | 4/1997 | Brookshire | 73/152.29 |
| 5,681,459 A * | 10/1997 | Bowman | 210/232 |
| 5,683,577 A * | 11/1997 | Nurse, Jr. | 210/170 |
| 5,762,790 A * | 6/1998 | Zoeller | 210/238 |
| 5,885,452 A | 3/1999 | Koteskey | |
| 6,012,871 A * | 1/2000 | Bryant | 405/40 |
| 6,015,488 A | 1/2000 | Gavin | |
| 6,090,282 A * | 7/2000 | Roman | 210/238 |
| 6,136,190 A | 10/2000 | Zoeller et al. | |
| 6,270,125 B1 * | 8/2001 | Rowley et al. | 285/242 |

OTHER PUBLICATIONS

Tuf-Tite• Corporation Effluent Filter EF-4 Production Information Sheet, published at least as early as Jul. 1999, showing conventional sanitary tee and length of PVC pipe, shown in cross-section for demonstrative purposes only.

* cited by examiner

FIG. 7
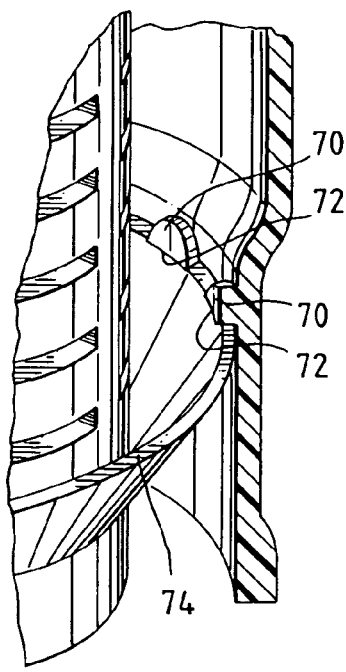
FIG. 8
FIG. 9
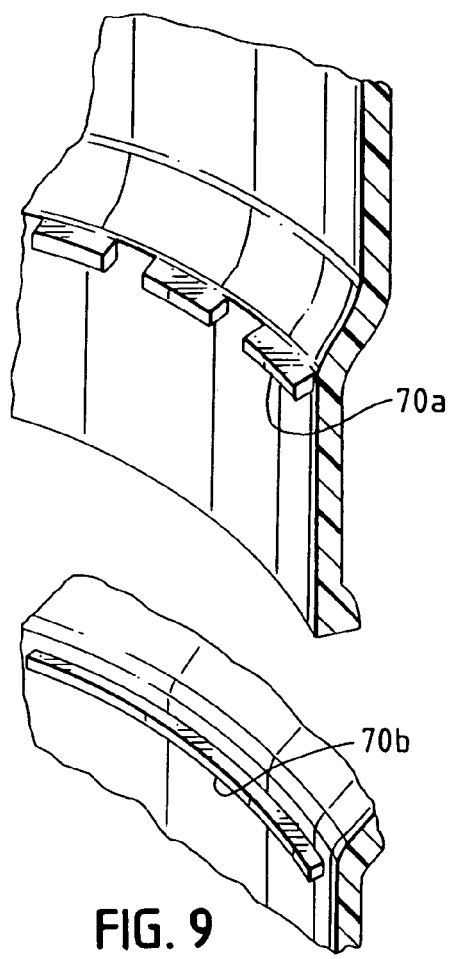
FIG. 10
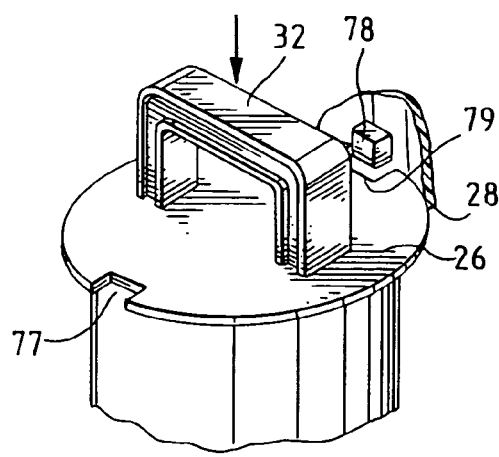
FIG. 11
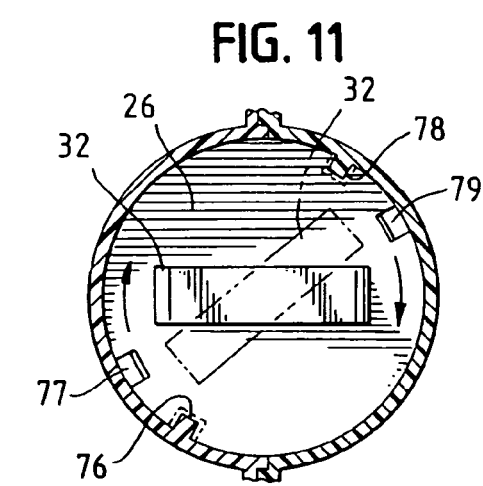

TEE BAFFLE FOR USE AT INLET OR OUTLET OF SEPTIC AND OTHER ON-SITE WASTE DISPOSAL SYSTEMS

BACKGROUND

1. Field of the Invention

The present invention relates generally to pipe fittings and, more particularly, to a tee provided at the inlet and/or outlet of a septic tank and other on-site waste disposal systems. The tee can be used as a housing for an effluent filter at the outlet of a septic tank, and can also be used without an effluent filter, in place of conventional pipe tees at the inlet of a septic tank.

2. Background

Most septic systems and other on-site waste disposal systems utilize pipe couplings, known in the art as so-called tees, for directing and controlling flow of sewage into, or effluent out of, the tank of the disposal system. Older concrete septic systems utilized cast-in concrete baffles at the inlet and outlet of the system. A drawback of concrete baffles is that the exposed portion thereof, i.e. that portion of the concrete baffles which is above the level of the scum layer within the septic tank, rapidly deteriorates. This is understood to be a result of exposure to gases within the tank. A recent trend to overcome this drawback has been the use of plastic tees to replace concrete baffles at both the inlet and outlet of the septic tank. Such a tee, also called a tee baffle, is often provided at the outlet of the disposal system to serve as a housing for an effluent filter, whether as a so-called multi-pass filter, as described in co-pending U.S. patent application Ser. No. 09/338,371, or as a so-called single-pass filter, as typified by U.S. Pat. No. 5,382,357. Alternatively, such a tee can be used at the inlet end of the disposal system, without a filter, so as to direct sewage to the bottom of the septic tank or other on-site waste collection tank. The tee baffle can have a right-angle shape, or more preferably, be in the form of a sanitary tee-type baffle, in which case it has an arching, or "sweep" design portion at the inlet/outlet port.

Typically, installers of septic tanks and other on-site waste disposal systems use standard tees or sweep tees manufactured primarily for use in plumbing applications, such as for pipe joints or couplings. As a result, such standard tees and sweep tees are not universally adequate for serving as the housing for an effluent filter inside the septic tank. They are relatively heavy, and relatively expensive for use in septic systems.

Another drawback of conventional tees is the difficulty and expense of molding such tees. Due to the necessity of having three openings and a hollow interior, complex molds are necessary to achieve a molded one-piece tee. Most injection molding techniques presently used to manufacture pipe tees leave undesirable interior seams and flash, which tend to impede insertion of effluent filters into the pipe tees, and adversely effect operation and sealing of the effluent filters and pipe tees. Also, because grease, fats, oils, hair, lint, and other floatables in effluent tend to collect at rough surfaces along the interior wall of a conventional pipe tee to thereby cause flow blockage, such seams or flash provide surfaces where such undesired waste products are likely to be deposited. Over time, solid and semi-solid waste in the effluent will build up, and slime will grow at such seams or flash, the combination eventually prematurely plugging the pipe tee. This undesirable plugging also detrimentally effects the needed sealing surfaces for the annular seals used with many prior art single-pass filters.

A recognized problem with conventional pipe tees used in on-site waste systems is that, once they start to become plugged, it is more difficult for the effluent to make its way through the pipe tee, through an effluent filter held therein, and out the outlet of the septic tank. Eventually, due to such plugging, among other reasons, the effluent in the septic tank rises to a level higher than the level of effluent in the pipe tee. This fluid level differential causes a build up of pressure, or head pressure, that is exerted on and within the open base of the pipe tee, i.e. in the region of the bottom of the effluent filter. In many cases, these head pressures undesirably cause the effluent filters to literally pop up out of the pipe tees. It would therefore be desirable for an effluent filter housing to not only help prevent premature plugging, but also include means for preventing the effluent filter from undesirably popping out of the tee housing.

Since conventional pipe tees are formed as relatively short-length plumbing couplings, they are not of sufficient length to encase or house any of the currently available effluent filters. Most known commercial single-pass effluent filters, as well as the multi-pass effluent filter that is the subject of co-owned U.S. patent application Ser. No. 09/338,371, require a generally cylindrical housing extending to cover much, if not all, of the extended length of the effluent filter. This is required in order to provide regions for filtered effluent to eventually reach the outlet port of the tee, and thereby exit the tank portion of the system, all without again mixing with unfiltered sewage.

Such generally cylindrical filter housings are usually provided by way of a length of PVC pipe cut down to fit one end of the available plumbing tees, and of sufficient length to cover the sealing gasket used with many of the known single-pass effluent filters. The gasket provides a sealing membrane between the effluent filter and the inner wall of the length of pipe, to substantially isolate a region therebetween to receive filtered effluent. Because commercially available PVC pipe is widely sold in lengths on the order of no shorter than 10', it is not uncommon for the installer to cut off a relatively short length of pipe, e.g. 12", from a 10' pipe section for coupling with a standard plumbing tee to thus create the needed cylindrical housing for the effluent filter.

It is also recognized that health-related codes and regulations in some jurisdictions, i.e. municipalities, counties, and states, require the elongated portion of pipe tees used in septic tanks to extend lower, i.e. deeper into the clear zone of the effluent in the septic tank, than is minimally necessary for the elongated portion of the tee to cover the effluent filter. It would be desirable, for use in such jurisdictions, and in other instances where longer tees are considered beneficial, such as for use in relatively deeper septic tanks, to easily adapt a pipe tee by lengthening the elongated portion thereof. In conventional tees, one would likely cut the length of pipe to its final desired length before connecting the pipe to the pipe tee. For example, when so-called schedule 40 pipe is used for extending a schedule 40 tee used in a septic tank to house an effluent filter; the schedule 40 pipe has a wall thickness of about 0.250". An extendable pipe tee that had a reduced wall thickness would therefore reduce the material needed for the effluent filter housing, yet still could be adaptable for use where longer pipe tees were desired.

One reason that such thick-walled pipe is used in conventional plumbing pipe tees is that such pipe must satisfy pressure-rated fitting requirements for use in non-septic tank locations, non-drainage locations, and under-floor locations, as well as in other applications where the pipe tees are subjected to high external pressures. Furthermore, those thick-walled pipes may be subjected to, and are made to withstand, high internal pressures, which are simply not encountered in septic tank and similar drainage systems. Because pipe tees used solely at the inlets and outlets of septic tanks and other on-site waste drainage systems are not used in under-floor applications, they are also not subjected to the high external pressures that typical plumbing tees must withstand. Thus, in septic tanks and other on-site drainage systems, pipe tees (whether installed at the inlet or outlet end) could be made in a way that substantially saves on molding materials and manufacturing costs, while still meeting, and even exceeding, the much lower internal and external pressure demands the pipe tees would encounter.

It would be desirable for pipe tees used in septic tanks and other on-site waste drainage systems to be made substantially thinner-walled than conventional pipe tees, yet still maintain sufficient structural integrity to withstand some forces, such as internal forces exerted during insertion or removal of effluent filters into or from the pipe tee. It would further be desirable for such a thinner-walled pipe tee to have a spigot or pipe-size end at the lowermost end thereof that has an outside dimension that is compatible with the inside of the bell end of an SDR 35 pipe or the hub of a sewer and drain SDR-35 fitting, so that in septic tanks, the pipe tee could still be connected to a bell end of a thin-walled pipe, as well as to the hub of an SDR-35 fitting (also known in the art as a sewer and drain fitting), ASTM 3034, ASTM 2729 pipe or bell. It is preferable to still use such thicker walled pipe as connections to the inlet and outlet ends of a septic system, but the present invention is directed toward avoiding the expense of such thicker walled tubing for the tee baffle on the interior of the septic tank, where such internal and external pressures are not encountered.

It is an object of the present invention to provide a tee suitable for use at the inlet or outlet of a septic tank or other on-site waste system that is relatively inexpensive.

It is another object of the present invention to provide a tee baffle with its own integral generally cylindrical portion that can provide a housing for many of the commonly available effluent filters having generally cylindrical profiles. Even at the outlets of septic tanks located in jurisdictions where effluent filters are not presently required or commonly used, it would still be desirable to use such tee baffles, because it may eventually become desirable to add an effluent filter at a later date, to meet later code requirements. The tee baffle of the present invention should therefore provide a way to later easily add an effluent filter at the outlet without having to then retrofit the septic tank with a special housing for the effluent filter.

It is a further object to provide specific structure for a tee baffle that promotes efficient operation of a given known effluent filter, whether of the single-pass or multi-pass type, yet does not interfere with the successful use of the tee with other known circular-shaped effluent filters. The manner in which these and other objects of the invention are achieved will become clear in the following Summary of the Invention, the drawing figures, and the Detailed Description of the Preferred Embodiment.

SUMMARY OF THE INVENTION

A preferably sanitary tee baffle, i.e., a tee having an arching sweep portion, is provided that is molded in one piece in one embodiment, or alternatively, in two distinct halves which are then mated with and rigidly fastened to one another, such that there are two seams longitudinally bisecting the resultant sanitary tee baffle. For reasons of brevity, the terms tee baffle and tee are used synonymously herein. Each of the mating halves of the sanitary tee baffle is in the shape of a lower case r, with an elongated main body portion extending substantially below the sweeping portion. In this manner, the sanitary tee baffle itself is of sufficient length to serve as a housing for an effluent filter, without the need for securement of additional lengths of pipe. The sanitary tee baffle of the present invention, whether formed of one or two pieces, is of reduced wall thickness over most of its length, as compared with conventional schedule 40 pipes and pipe tees, which generally have a wall thickness of about 0.250". The reduced wall thickness, on the order of between 0.075" and 0.100", and preferably about 0.0901", means a substantial savings in material and molding expense.

The two-piece sanitary tee baffle has a total of six mating edges, which extend between an inner slanted shoulder of the hub near the top of the sanitary tee baffle, an inlet/outlet port, and a lowermost end of the sanitary tee baffle. The inner slanted shoulder of the hub provides a stop for a cap of the effluent filter. The mating edges of one of the mating halves are provided with tongues extending substantially the length of each respective edge, and projecting perpendicularly from such respective edge. The tongues are received in grooves, respectively provided in each of the corresponding mating edges of the other mating half of the sanitary tee. Each of the mating edges are provided with smooth portions that extend outwardly of the tongues and grooves. The smooth portions provide additional surface area for solvent welding of the two mating halves, as well as providing elongated ridges on the outside of the sanitary tee for clamping the mating halves to one another during curing of the solvent. Preferably, there is a clearance fit, both width-wise and depth-wise, between the tongues and the grooves, so as to provide sufficient room for the solvent and to facilitate assembly.

The sanitary tee is also provided with one or more integral annular strengthening ribs on the outer wall to provide reinforcement to the otherwise thin walled thicknesses. The lower region of the tee includes a cylindrical portion that tapers inwardly down to a smaller diameter lowermost end of the tee. This lowermost end advantageously can be used to couple with the bell end of a length of additional pipe to further lengthen the sanitary tee, if needed. This would be advantageous because the thinner-walled pipe achieves what conventionally required Schedule 40 pipe. The inner wall of the lowermost end also provides an improved seal surface for the annular gaskets provided on many commercial single-pass type effluent filters.

The more preferred one piece tee baffle of the present invention is provided with a plurality of annular rigidifying ribs in the lower portion thereof, such lower portion acting as a hub-receiving end. These and other aspects of the invention are further described in the following detailed description of the preferred embodiment and the drawings.

DESCRIPTION OF THE DRAWINGS

FIG. 7 is an enlarged view, taken along line 7 of FIG. 6, showing inwardly-directed semi-circular tabs, by which the sealing gasket of a single-pass effluent filter engages locking rims of the tee baffle;

FIG. 8 is an enlarged view showing a first alternate type of inwardly-directed tabs that can be used to lockingly engage the sealing gasket of a single-pass effluent filter;

FIG. 9 shows a second alternate type of inwardly-directed tab, in the form of an inwardly-directed annular rib that can be used to lockingly engage the sealing gasket of a single-pass effluent filter;

FIG. 10 is a perspective view of the top of an effluent filter and a portion of the inner wall of the tee baffle of the present invention, showing means for locking the cap of the effluent filter within the tee baffle;

FIG. 11 is a top view of the effluent filter and tee baffle shown in FIG. 10, with the effluent filter locked in position within the tee baffle;

DETAILED DESCRIPTION OF THE PREFERRED EMBODIMENT

Figure 1:
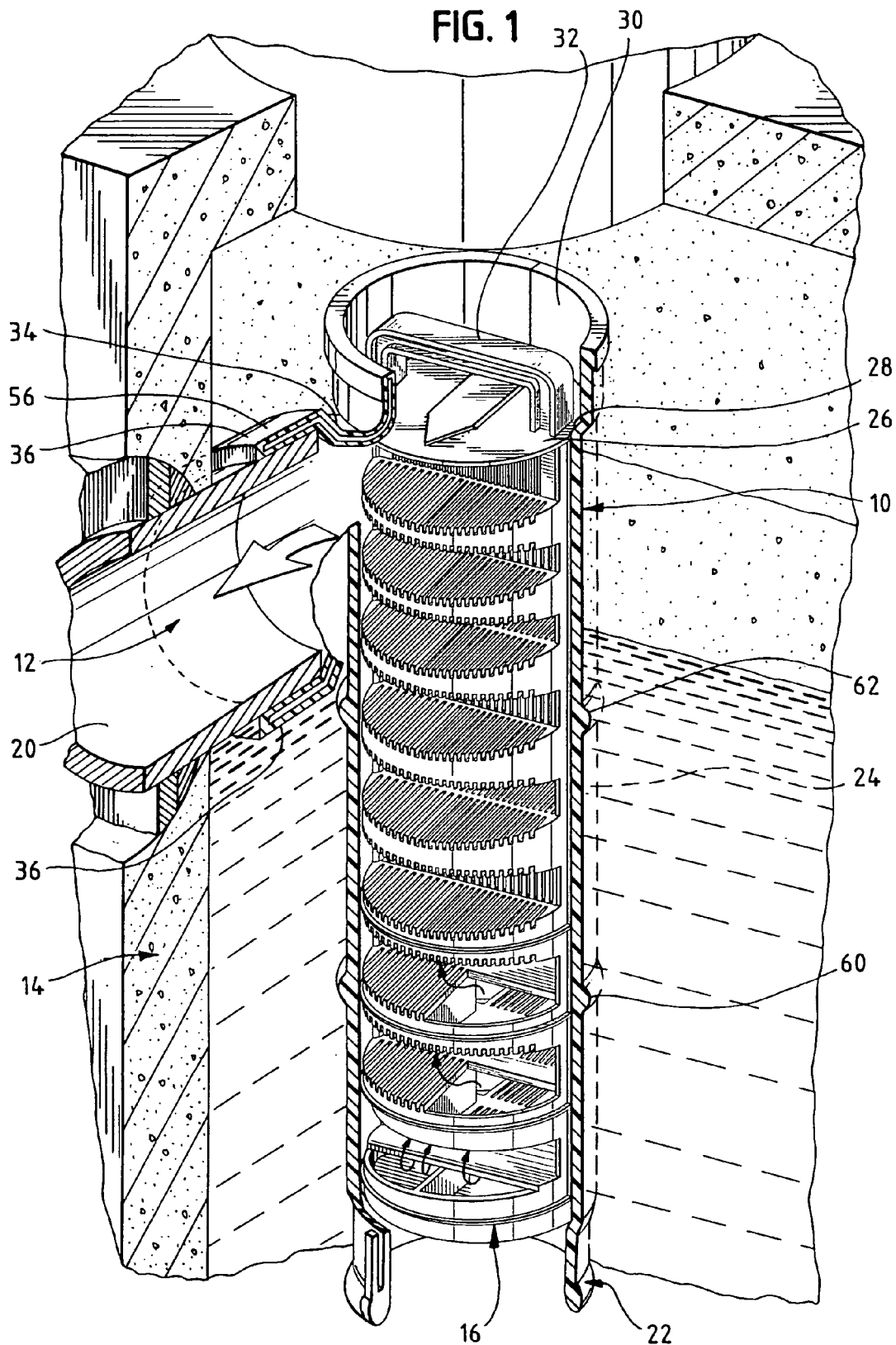
FIG. 1 is a front perspective view, partially cut away, of a two piece tee baffle of the present invention in combination with a multi-pass effluent filter, an outlet port of a septic tank, and a drainage pipe leading from the two piece tee through the outlet port of the septic tank.

A sanitary tee 10 of the present invention is used at an outlet opening 12 of a septic tank 14, and can serve as a housing for an effluent filter 16, as shown in FIG. 1 as a multi-pass type effluent filter. Before exiting the septic tank 14 through a drainage pipe 20, effluent passes into a lowermost end 22 of the sanitary tee 10. The effluent then is filtered through the effluent filter 16 substantially occupying the hollow space in an elongated main body portion 24 of the sanitary tee 10. The cap 26 of the effluent filter 16 rests on a tapered rim 28, or inner slanted shoulder, at the intersection of the elongated main body portion 24 and a bell-shaped upper end or hub 30 of the sanitary tee 10.

The hub 30 is preferably in the form of a ring that is open at the top to allow for access to the handle 32 of the effluent filter 16, provided on a top side of the cap 28. The sanitary tee 10 further includes an arching sweep portion 34 that defines an opening in communication with the opening in the elongated main body portion 24, to direct filtered effluent out through a ring-shaped outlet port 36. When used at the inlet of a septic tank, the sweep portion 34 instead directs sewerage down into the elongated main body portion 24, and toward the bottom of the septic tank. The drainage pipe 20 is received in the inlet/outlet port 36 of the sanitary tee 10 to drain filtered effluent through the outlet opening 12 of the septic tank 14.

It should also be noted that the hub 30 may, in certain instances, not extend high enough above the inlet/outlet port 36 to satisfy some regulatory requirements. In such cases, it is helpful that the hub can be extended by simply frictionally fitting a smaller diameter pipe segment, such as SDR 35 (ASTM 3034) 4" pipe or ASTM 2729 4" pipe, of sufficient length to meet such regulations, or local customs or standards. Alternatively, a bell end or coupling (also not shown) could be secured, e.g. glued, over the outside of hub 30, and a suitable riser pipe (not shown) would fit into such a coupling. The coupling would have a sufficient inner diameter to accommodate the outer diameter of hub 30, and preferably, the riser pipe added to the coupling has an inner diameter at least as wide as the inner diameter of the hub 30, whereby there is sufficient clearance provided for access to, and changing of, effluent filters 16.

Figure 3:
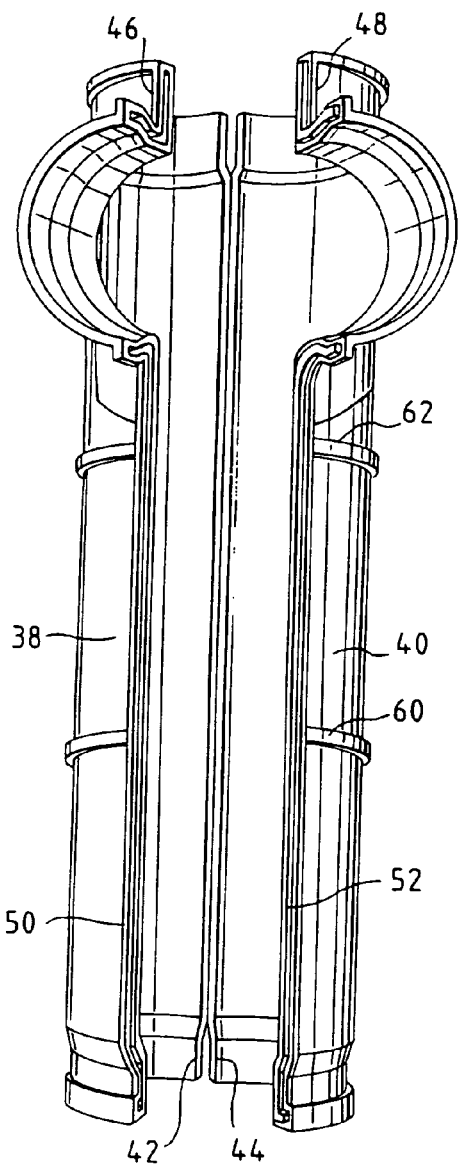
FIG. 3 is a partially exploded view of the two piece tee baffle shown in FIG. 2.

The sanitary tee 10 is formed in this embodiment in two parts, so that it comprises a first mating half 38 and a second mating half 40, as shown in FIG. 3. Each of the first and second mating halves 38, 40, is generally r-shaped. There are a total of six mating edges 42, 44, 46, 48, 50, 52, used to secure the mating halves 38, 40 to one another. In order to facilitate secure interconnection between the two mating halves 38, 40, a tongue-and-groove fitting is provided along substantially the entire length of the mating edges 42, 44, 46, 48, 50, 52. To ensure proper fitting, the two mating halves 38, 40 can be simultaneously molded, and allowed to cool under identical ambient conditions. A solvent welding plastic sealant or glue is preferably applied into the grooves 56 in the mating halves of the tee baffle prior to joining the two halves together. The sealant, such as PVC plastic pipe cement, available from IPS of Gardena, Calif. under the trade name "Weld-On", helps to ensure a liquid-tight seal.

Figure 4:
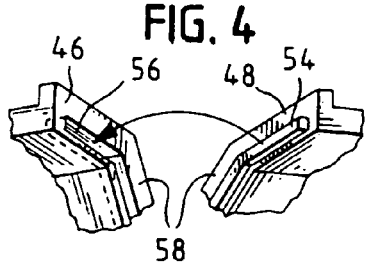
FIG. 4 is an enlarged view of a portion of the joint along a side edge of each of the halves of the two piece tee baffle shown in FIG. 3.
Figure 5:
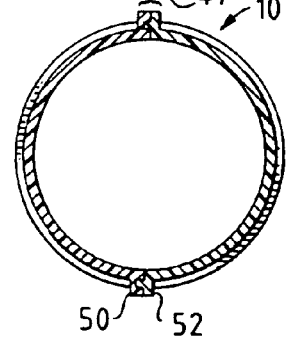
FIG. 5 is a cross-sectional view of the joint between the side edges of each of the halves of the two piece tee baffle, taken along lines 5-5 of FIG. 2.
Figure 5A:
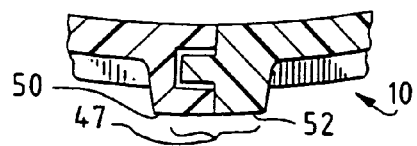
FIG. 5A is an enlarged cross-sectional view of the joint between two of the side edges of the halves of the two piece tee baffle.
Figure 6:
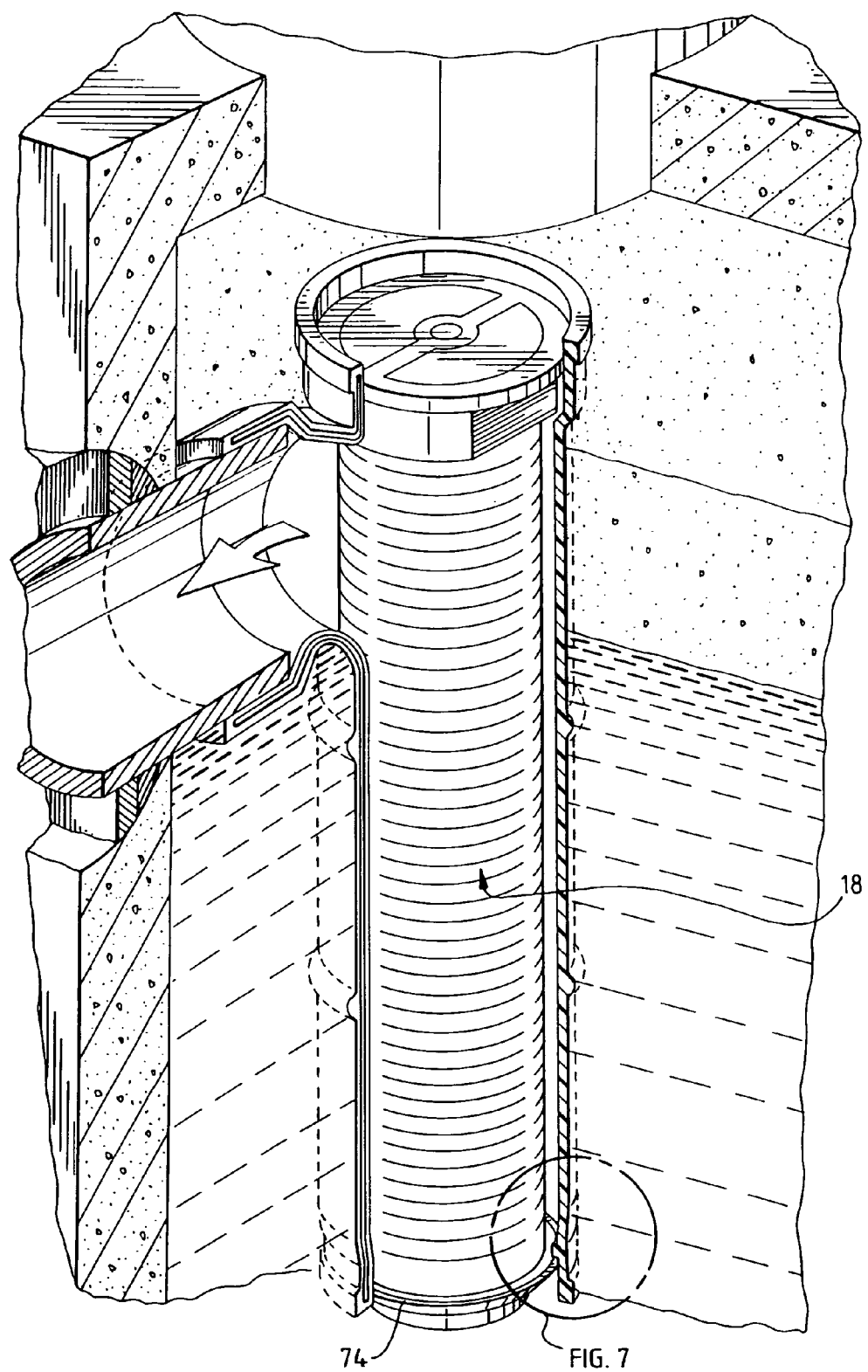
FIG. 6 is a front perspective view, partially broken away, of the two piece tee baffle of the present invention in combination with a single-pass effluent filter, an outlet port of a septic tank, and a drainage pipe leading from the two piece tee through the outlet port of the septic tank.

In order to provide an easy-to-assemble tee baffle, the tongue-and-groove fitting is preferably a clearance fit. In the preferred embodiment, the raised tongues 54 extending along each edge 44, 48, 52 of the second mating half 40 preferably has a width of about 0.045", while the respective grooves 56 along the edges 42, 46, 50 of the first mating half 38 preferably each has a width of about 0.075". The grooves 56 are also preferably deeper, by about 0.008-0.010", than the height of the raised tongues 54. The clearance fit of the tongue-and-groove connection facilitates assembly, and also provides adequate room inside the plastic weld joint to receive a sufficient quantity of the sealant to ensure a secure bond. The pairs of mating edges 42, 44, 46, 48, 50, 52 cooperate to form elongated strengthening ribs 47 along the vertical axis of the tee baffle 10. Advantageously, each edge 42-52 of the two mating halves is provided with a flat elongated extension of the edge outwardly of the tongue 54 and outwardly of the groove 56, as shown in FIG. 4. The flat extension portion 58, preferably having a thickness of about 0.130", provides a pair of smooth, sealant-receiving surfaces to extend the region, i.e. extent of interconnection of the mating halves 38, 40.

The flat extensions 58 of the edges 42-52 also provide locations on the exterior of the tee baffle for clamping the mating halves to one another during assembly, i.e. primarily during curing of the sealant. The flat extensions 58 of the seam result in an effective gluing surface for each edge of the two mating halves 38, 40 that is preferably about 0.250" in width dimension. Thus, while most of the wall area of the assembled tee 10 of the present invention advantageously has a reduced wall thickness, i.e. preferably on the order of 0.075"-0.100", and most preferably approximately 0.090", the seams still have an increased wall thickness more commensurate with the wall thickness of traditional pipe tees. As a result, the connecting seams of the sanitary tee 10, which might otherwise be considered weak portions of the tee, instead have strength characteristics similar to conventional pipe tees.

To even further increase the strength of the thin-walled sanitary tee 10 of the present invention, annular ribs 60, 62 are provided at one or more locations along the elongated main body portion 24 of the present sanitary tee 10. These annular ribs 60, 62 are areas of increased wall thickness that advantageously allow for a reduced wall thickness tee to still exhibit high strength characteristics, and in particular, to exhibit strength that is more than adequate for use in septic tanks and other non-pressurized on-site drainage applications.

Advantageously, once connected, the two mating halves 38, 40 of the sanitary tee 10 define a generally cylindrical hollow opening. When the two piece tee baffle is placed at the inlet of a septic tank, no effluent filter is used. Instead, the tee baffle serves the purpose of directing sewage toward the bottom of the septic tank 14, and prevents any rush of incoming sewage from creating unnecessary waves in the septic tank 14.

However, when used to receive one of a variety of commercially available effluent filters 16, 18 having cylindrical profiles or cylindrical footprints, the two piece sanitary tee 10 is then used as a filter receptacle at the outlet of the septic tank 14. Then, when an effluent filter 16, 18 (whether of the single-pass type, as in FIG. 7, or of the multi-pass type, as in FIG. 1) is placed therein, the effluent filter 16, 18 directs unfiltered effluent from the so-called clear zone, through the effluent filter 16, and ultimately allows filtered effluent to pass through the outlet 12 of the septic tank and off to a nearby drainage field (not shown). The latter is preferably accomplished by means of an drainage pipe 20 connected to the ring-shaped outlet port 36 of the present tee baffle.

Figure 2:
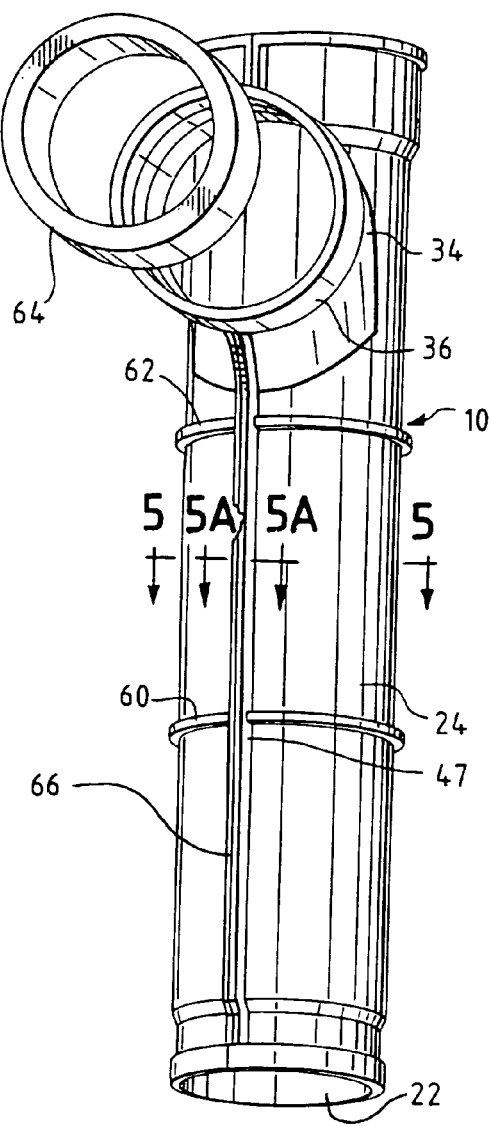
FIG. 2 is a front perspective view of a two piece tee baffle of the present invention and a reducer bushing.

While schedule 40 pipe is typically used for drainage at the inlet and outlet ports of septic tanks, it is recognized that it may be desired to use thinner walled pipe than schedule 40 pipes, such as SDR 35 pipe or ASTM 2729 pipe. Thus, to accommodate such thinner walled or other varying outside diameters of such different sized pipes, a cylindrical reducer bushing, denoted by reference number 64, shown in FIG. 2, can be used in the ring-shaped inlet/outlet port 36 of the sanitary tee 10 in order to securely accommodate such smaller pipes. The reducer bushing 64 is preferably secured by means of a plastic weld sealant, again such as the PVC plastic pipe cement used to bond the two mating halves of the tee to one another, as described above. On the other hand, the reducer bushing 64 is not used when the drainage pipe 20 comprises a larger diameter so-called schedule 40 pipe.

Once the two mating halves 38, 40 of the sanitary tee 10 are secured to one another, the sanitary tee 10 serves as a rigid unitary member, operable in the manner that pipe fittings from the plumbing industry are conventionally used. However, the sanitary tee 10 of the present invention advantageously includes the integral longitudinal extension, achieved by the elongated main body portion 24, which avoids having to cut a small length of separate pipe for the vertical portion of a conventional tee. The sanitary tee 10 of the present invention also reduces the need for extra molding material by utilizing reinforced thinner walls, i.e. having a wall thickness significantly less than schedule 40 pipe along most of its length.

However, the present sanitary tee 10 still advantageously has a hub at its inlet or outlet port, with an internal diameter that is equal to the inner diameter of a schedule 40 sized hub. Further, the sanitary tee's walls are reinforced, i.e. by means of integral annular ribs 60, 62 provided about the exterior of the tee baffle, and longitudinal rib members 66 extend along each of the two longitudinal seams, all on the sanitary tee's exterior surfaces. As such, the exterior of the sanitary tee 10 is interrupted with these horizontal and vertical ribs. Nevertheless, the interior walls of the sanitary tee 10 are substantially smooth. The smoothness facilitates ease of insertion and/or removal of the effluent filter 16, 18, and avoids premature plugging of the pipe tee, as may otherwise be caused by the collection of grease, fats, oils, hair, lint and other floatables at rough surfaces or flash in a conventional pipe tee.

Another important advantage of the annular ribs 60, 62 and the longitudinal ribs 66 is that they not only provide the beneficial reinforcing function discussed above, but they also provide a molded-in runner system that, during injection molding of the tee baffle 10, helps distribute plastic along the tee baffle.

Although both the inner and outer surfaces of the elongated main body portion 24 of the sanitary tee 10 can be tapered inward in the vicinity of its lowermost end 22, this need not be the case. The elongated main body portion 24 of the tee baffle 10 can instead have a uniform diameter. The lowermost end region can be advantageously coupled with a bell end of schedule 35 pipe, which pipe end can be glued in place to further extend the elongated main body portion 24 of the sanitary tee 10, if needed. Alternatively, a straight coupler fitting can be solvent-welded to the lower end region of the tee baffle, and any desired length of straight schedule 35 pipe could be solvent welded into the other end of the coupler fitting in order to increase the present tee 10 to the desired length. Also, the upper hub 30 of the sanitary tee 10 is purposely open in order to provide access to an effluent filter 16, 18 housed within the sanitary tee, i.e. to facilitate its removal for cleaning, replacement, re-insertion, or other maintenance purposes. If desired, the upper hub 30 can be closed off with a standard pipe end plug (not shown).

Importantly, the inner wall of the present sanitary tee 10 can be provided with means for securing various types of single-pass effluent filters 18 within the tee, assuming such effluent filters have a circular profile that fits within the sanitary tee 10. That is, most effluent filters are provided with their own sealing gaskets or flanges, however many conventional gaskets have been found to be inadequate to prevent the premature upward movement of the effluent filter within a conventionally formed tee. As described above, such unwanted upward movement, or "popping up" of the effluent filter, can be caused by grease, fats, oils, dirt and biological growth plugging the interior of a conventional tee, which results in a pressure differential between the septic tank and the interior level of effluent in the tee, thereby forcing up the filter element.

The present invention sanitary tee 10 thus assists in resisting premature upward movement or ejection of the effluent filter. This is accomplished by providing inwardly directed flanges or projections along the tee's inner wall in the vicinity of the upper hub 30 of the tee, just above a ridge formed in the tee over the top of the sweep opening at the outlet of the tee, where the tee widens to accept the cap 26 of an effluent filter. For example, securement means in the form of inwardly-directed raised buttons or ribs 68 would be provided on the inner wall of the hub of the tee. Preferably, these buttons 68 are located at approximately 20° and 200° (with the center of the outlet opening being at a 90° location relative to the opening at the top of the upper hub 30).

The cap 26 of the effluent filter 18 then would advantageously be provided with complementary recesses or openings to allow the cap 26 to pass over the buttons or ribs during insertion or removal of the effluent filter. Then, in a bayonet fitting-type operation, once the cap of the effluent filter passes the ribs or buttons, the effluent filter is rotated to a secured position, so that the ribs or buttons lock the cap of the effluent filter in place on the ridge at the lower end of the hub of the tee, where the slanted ridge is provided.

An additional means for securing certain types of effluent filters within the tee 10 is to provide inwardly-directed elements 70 on the smooth inner wall of the tee, such as in the form of rims 72 that are undercuts of the elements 70, which facilitate locking the sealing gasket of the effluent filter in place against the sanitary tee 10. For example, one commercially available single-pass effluent filter 18, as shown in FIG. 7, wherein the effluent only passes through filtering slits once, has a flexible sealing gasket 74 located near a lower end of the filter.

Advantageously, the present invention provides a way to reinforce the retaining contact between the sealing gasket 74 and the inner wall of the present sanitary tee 10, by providing such inwardly-directed elements 70 with flat rims 72 on their underside. The rims 72 are preferably located near the bottom of the pipe tee, i.e. on the inner wall of the inwardly-tapered and reduced diameter lowermost end 22 of the pipe tee.

When the sanitary tee 10 of the present invention is manufactured by injection molding, the desired rims can be created by using injector pins that have been reduced in size at their ends to intentionally leave a sufficient amount of inwardly-directed excess material at desired locations along the inner wall of the tee. As shown in FIG. 7, the resultant flat rims 72 created at the bottom of these excess material elements, when the injector pins are removed, advantageously create locking surfaces against which the sealing gasket 74 of the single-pass effluent filter 18 can be biased, i.e. get caught on, once the effluent filter 18 is fully inserted into the tee. In fact, an audible snap can be detected when the sealing gasket 74 passes over the elements 70 and engages against the rims 72, as the sealing gasket 74 briefly loses, and then reacquires, fully extending sealed engagement with the inner wall of the tee. This audible snap informs the installer that the single-pass effluent filter 18 is then fully inserted into the tee. While the elements 70 are preferably semi-circular or half-moon shaped, it is recognized that similar sealing engagement with the sealing gasket 74 can be accomplished with short annular rib segments 70a, as shown in FIG. 8, or with long annular rib segments 70b, as shown in FIG. 9, or various other shapes.

Another beneficial feature of the present invention is the improved ability to prevent the effluent filter 16 from popping up and out of the tee baffle 10. As shown in FIGS. 10 and 11, this is accomplished by additional flanges or locking lugs 76, 78 provided on the interior surface of the elongated main body 24 of the tee baffle 10, located just above the tapered rim 28. Corresponding lug-receiving apertures 77, 79 are provided in the cap 26 of the effluent filter 16. Thus, by aligning the lug-receiving apertures 77, 79 of the effluent filter 16 with the corresponding locking lugs 76, 78 near the tapered rim 28 of the tee baffle 10, inserting the effluent filter 16 into position so that the cap 26 rests on the tapered rim 28, and then rotating the effluent filter 16 using the handle 32 until the locking lugs 76, 78 are out of alignment with the lug-receiving apertures 77, 79, the effluent filter 16 will be prevented from popping out of the tee baffle 10 under the forces that may be exerted by a build-up of pressure underneath the effluent filter 10.

Figure 12:
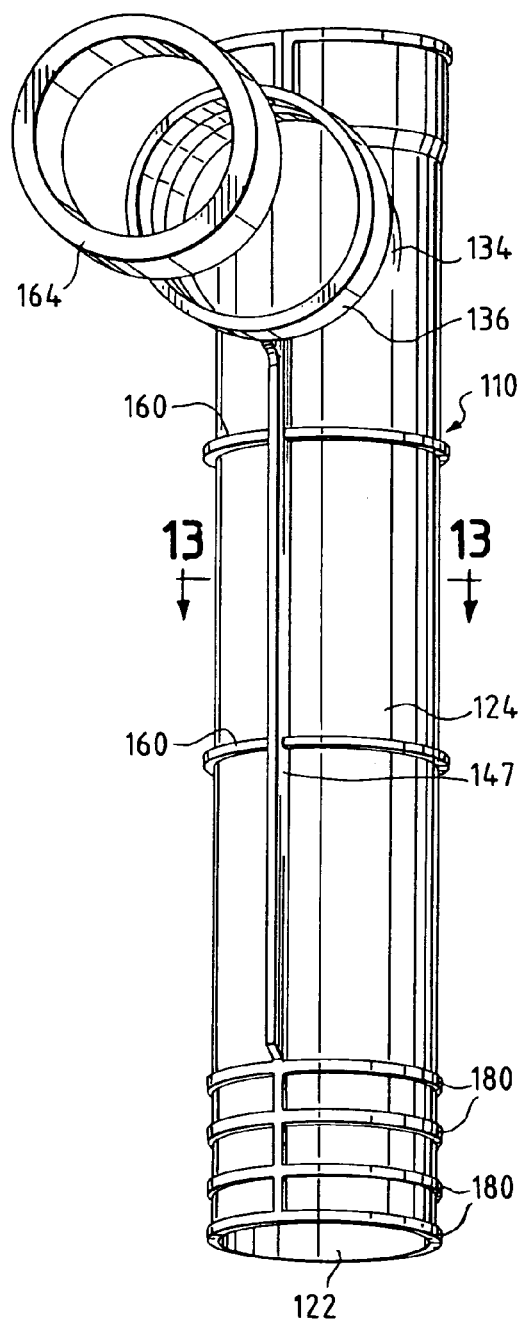
FIG. 12 is a front perspective view of a preferred one piece tee baffle of the present invention, and a reducer bushing.
Figure 14:
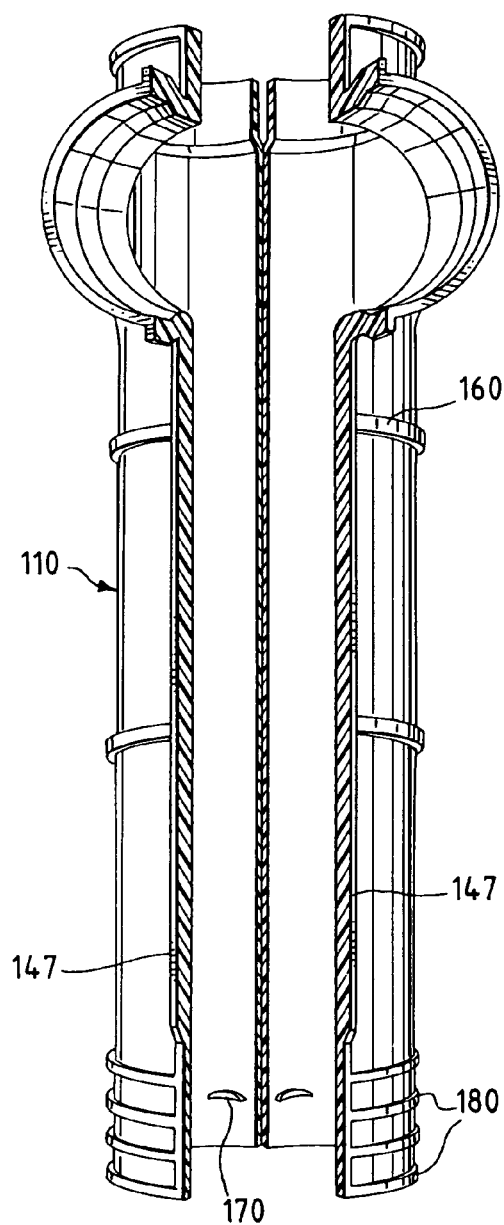
FIG. 14 is a partially exploded view of the one piece tee baffle shown in FIG. 12, wherein the one piece tee baffle has been bisected along its vertical axis.
Figure 13:
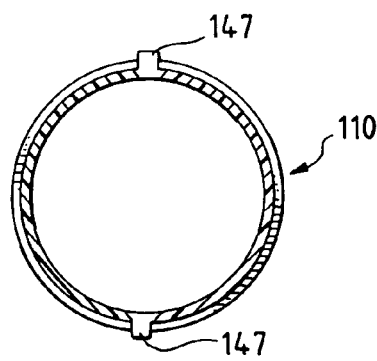
FIG. 13 is a cross-sectional view, taken along lines 13-13 of FIG. 12.

Turning now to FIGS. 12-14, the inventor's most preferred embodiment of the present invention is to have the tee baffle molded as a single piece, while still maintaining the attributes of the thin-walled two piece tee, and still accomplishing the effectiveness of that two-piece tee over a conventional prior art tee when used in septic and other on-site waste disposal settings, with or without an effluent filter housed within the tee. Specifically, in FIGS. 12-14, a one piece tee 110 is provided, having an elongated main body portion 124. A plurality of integral annular strengthening ribs 160 are provided along the length of the elongated main body portion 124. The broken-open depiction of the tee 110 in FIG. 14 is merely for illustrative purposes, with the cross-hatching along the length of the tee baffle 110 demonstrating a hypothetical vertical cut along the length of the one-piece tee baffle 110 so that the smooth, uniform diameter interior surface of the tee baffle 110 can be readily seen.

The one-piece tee baffle 110 may be in the form of a sanitary tee, having an arching sweep portion 134 which terminates in an inlet/outlet opening 136. This inlet/outlet opening 136 can receive a reducer bushing 164. Since the tee baffle 110 is formed as a single part, there are no seams. However, because of the thin-walled construction, also on the order of between 0.075" and 0.100", most preferably about 0.090", it is beneficial to provide longitudinal strengthening ribs 147 along the vertical axis of the tee baffle 110. At a lower end of the elongated main body portion 124, there are a plurality of annular strengthening ribs 180 in the vicinity a hub-receiving end 122. Advantageously, the one piece tee baffle 110 maintains a thin wall profile over most of its area, substantially reducing manufacturing costs as compared with conventional prior art tees, while still exhibiting sufficient rigidity and strength, by virtue of the vertical ribs and annular ribs 160, 180. As in the two piece tee baffle, locking elements or tabs 170 may be provided within the elongated main body 124 to sealingly engage an annular gasket of a single pass effluent filter.

The vertical ribs 160 of the one-piece tee 110 (as well as the longitudinal ribs 66 in the two-piece tee 10) are preferably located at 180° to one another, but it is recognized that this need not be the case, and instead, for example, there may be three such ribs provided at 60° intervals between one another. The vertical ribs 160 of the one-piece tee 110 also perform the same molded-in runner system benefit of the longitudinal ribs 66, by helping to distribute plastic along the tee 110 during injection molding.

While the present invention has been described with respect to certain embodiments thereof, it is not intended to be limited thereto. It will be understood by those of ordinary skill in the art that variations on the embodiments discussed herein can be made that are still within the literal scope of, or are considered equivalents of, the appended claims.

I claim:

1. A tee for use at the inlet or outlet of a septic tank, the tee comprising:

an elongated generally cylindrical injection molded plastic main body portion defining a tubular opening, the tubular opening being adapted to receive a filter therein;

a cylindrical injection molded plastic uppermost hub coaxial with said elongated main body portion and having an inner diameter greater than the diameter of the elongated main body portion;

an inlet/outlet port in communication with the tubular opening, the inlet/outlet port having an inlet/outlet hub at an open end thereof, said inlet/outlet hub having a diameter sized so as to receive a pipe of a first outer diameter and being adaptable to receive a pipe of a second outer diameter, said diameter of the inlet/outlet hub being greater than the diameter of the elongated main body portion;

a first injection molded plastic rib extending generally longitudinally along said elongated injection molded plastic main body portion;

a second injection molded plastic rib extending generally longitudinally along said elongated injection molded plastic main body portion, wherein said first and second injection molded plastic ribs extend outwardly from an outer wall of the elongated injection molded plastic main body portion and said uppermost hub; and seams coextending with said first and second ribs.

2. A tee for use at the inlet or outlet of a septic tank, the tee comprising:

an elongated generally cylindrical injection molded plastic main body portion defining a tubular opening, the tubular opening being adapted to receive a filter therein;

a cylindrical injection molded plastic uppermost hub coaxial with said elongated main body portion and having an inner diameter greater than the diameter of the elongated main body portion;

an inlet/outlet port in communication with the tubular opening, the inlet/outlet port having an inlet/outlet hub at an open end thereof, said inlet/outlet hub having a diameter sized so as to receive a pipe of a first outer diameter and being adaptable to receive a pipe of a second outer diameter, said diameter of the inlet/outlet hub being greater than the diameter of the elongated main body portion; and at least two horizontal reinforcement ribs on an outer wall of the elongated main body portion.

3. A tee for use at the inlet or outlet of a septic tank, the tee comprising:

an elongated generally cylindrical injection molded plastic main body portion defining a tubular opening, the tubular opening being adapted to receive a filter therein;

a cylindrical injection molded plastic uppermost hub coaxial with said elongated injection molded plastic main body portion and having an inner diameter greater than a diameter of the elongated injection molded plastic main body portion;

an inlet/outlet port in communication with the tubular opening, the inlet/outlet port having an inlet/outlet hub at an open end thereof, said inlet/outlet hub having a diameter sized so as to receive a pipe of a first outer diameter and being adaptable to receive a pipe of a second outer diameter, said diameter of the inlet/outlet hub being greater than the diameter of the elongated injection molded plastic main body portion;

an outer wall on said elongated injection molded plastic main body portion; and at least one horizontal reinforcing rib on said outer wall.

* * * * *